INVENTOR.
WILLIAM C. COOK

Aug. 31, 1965  W. C. COOK  3,203,319
INTERNAL LOCK FOR HYDRAULIC ACTUATOR
Filed Feb. 7, 1963  3 Sheets-Sheet 3

INVENTOR.
WILLIAM C. COOK
BY
*George C. Sullivan*
Agent

United States Patent Office 3,203,319
Patented Aug. 31, 1965

3,203,319
INTERNAL LOCK FOR HYDRAULIC
ACTUATOR
William C. Cook, Marietta, Ga., assignor to Lockheed
Aircraft Corporation, Burbank, Calif.
Filed Feb. 7, 1963, Ser. No. 257,013
7 Claims. (Cl. 91—45)

This invention relates to an internal locking mechanism for a hydraulic actuator, and more particularly to a piston mounted end lock for a hydraulic actuator.

Although a hydraulic actuator constructed in accordance with this invention is adapted for use in any environment where there is a need to move an object relative to a datum by the use of hydraulic fluid pressure as a motive force, it finds particular utility in the aircraft industry for moving such components as a wheel bogie relative to the airplane fuselage, and it is in the aircraft industry environment in which its benefits and assets become most pronounced. An important consideration in the design of an aircraft and its components is that of design simplicity for reliability and long life with minimum weight. Heretofore, in an effort to meet this criterion, numerous hydraulic actuators with positive acting internal piston mounted end locks have been designed and the United States Letters Patent 3,008,454 issued to R. M. Wilkins, patented November 14, 1961, and U.S. Patent 2,764,132 to Bakke, patenteded September 25, 1956, are representatives of approaches taken in the design of such hydraulic actuator locking mechanisms. These hydraulic actuator locking mechanisms require maintenance of the locking segments into biasing engagement with the cylinder barrel during their extension and/or retraction stroke. Thus, the lock segments drag and scrape along the interior surface of the cylinder barrel with which they are in contact and in so doing, have a tendency to gall or score the surface of the cylinder barrel. To eliminate the adverse effects of such scraping action, the lock segments of such locking devices are made of a low strength material, such as brass, so that the lock segments will wear away while the cylinder barrel, made of a higher strength material, remains intact to extend the life of the actuator and prevent leakage, etc. Lock segments made of low strength materials must be quite large to support heavy equipment such as a wheel bogie, and must additionally be provided with an expendable, wearable portion. To eliminate the disadvantages and limitations of such prior art hydraulic actuator locking devices, there is provided in accordance with this invention a positive-acting hydraulic actuator internal locking mechanism wherein the lock segments thereof are maintained out of biasing engagement with the cylinder barrel during extension and retraction of the piston, thereby making it possible to use tough, durable, high-strength lock segments thereby permitting a decrease in the weight and size of the hydraulic actuator assembly.

Accordingly, it is an object of this invention to provide a lightweight, positive-acting hydraulic actuator locking mechanism.

Another object of this invention is to provide a piston mounted hydraulic actuator locking mechanism wherein the locking segments engagement with the cylinder barrel during extension and retraction of the piston is minimized.

Still another object of this invention is to provide a hydraulic actuator locking mechanism utilizing lock segments which are made of a strong, durable material.

A further object of this invention is to provide a differential pressure area operated lock segment actuator.

A still further object of this invention is to provide cam operated lock segments for a hydraulic actuator which are cammed toward locking position only in one position of the actuator.

Other objects and advantages will become apparent from the following description taken in connection with the accompanying drawings in which.

Generally stated, this invention comprises a hydraulic actuator incorporating a piston mounted locking means, wherein the locking means is only actuated into its locking position with respect to the actuator body upon movement of the piston to a lockable position. Such arrangement further permits minimum biasing engagement of the locking segments with the side walls of the cylinder barrel body of the actuator during extension and retraction of the piston and therefore the locking segments can be made of strong, durable material while at the same time avoiding galling or scoring the cylinder. Accomplishment of maintaining the lock segments out of biasing engagement with the actuator body is achieved by providing a differential pressure area operated lock segment actuator.

Figure 1:
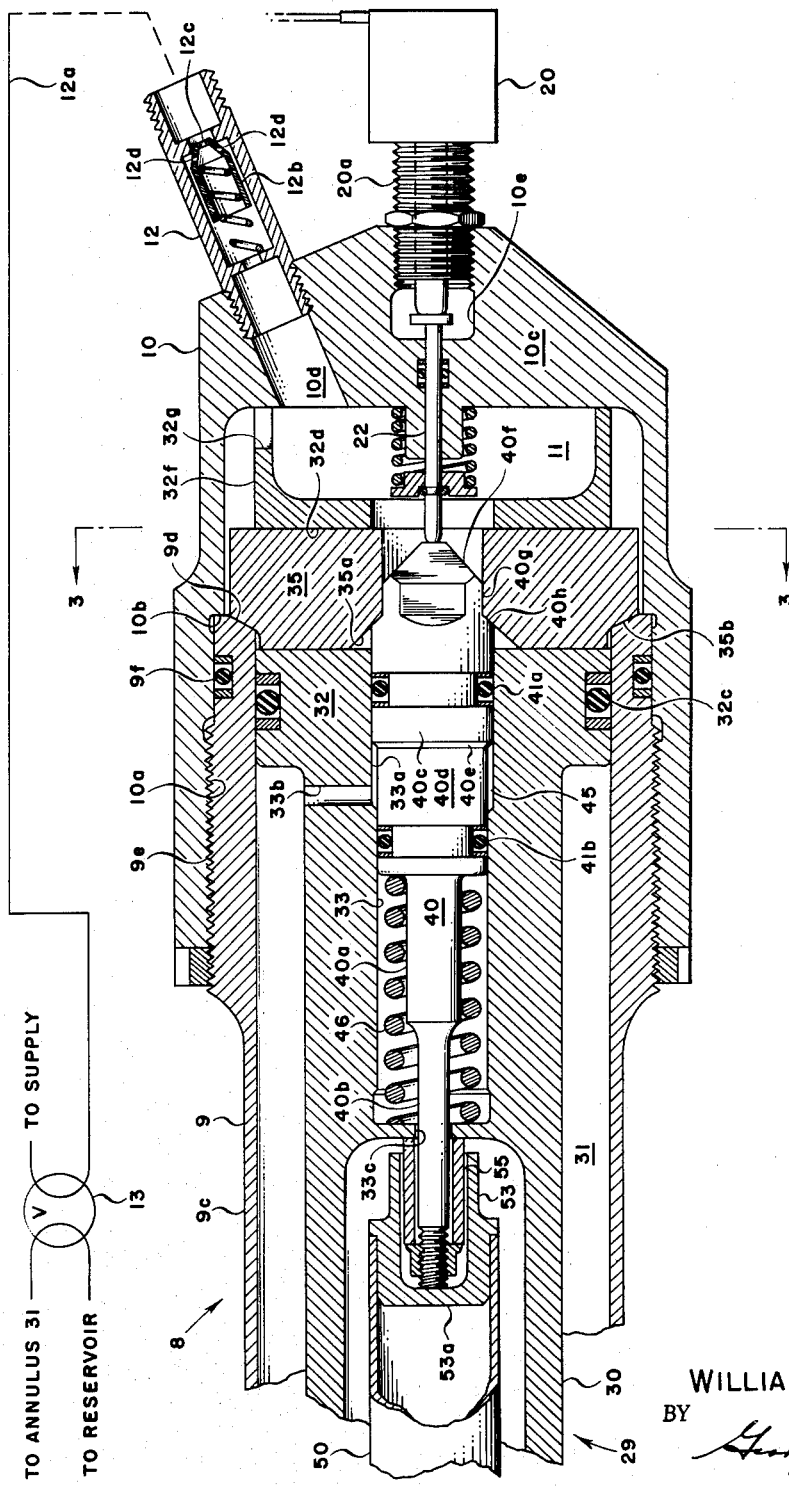
FIGURE 1 is a cross-sectional view of one end of a hydraulic actuator embodiment of this invention.
Figure 2:
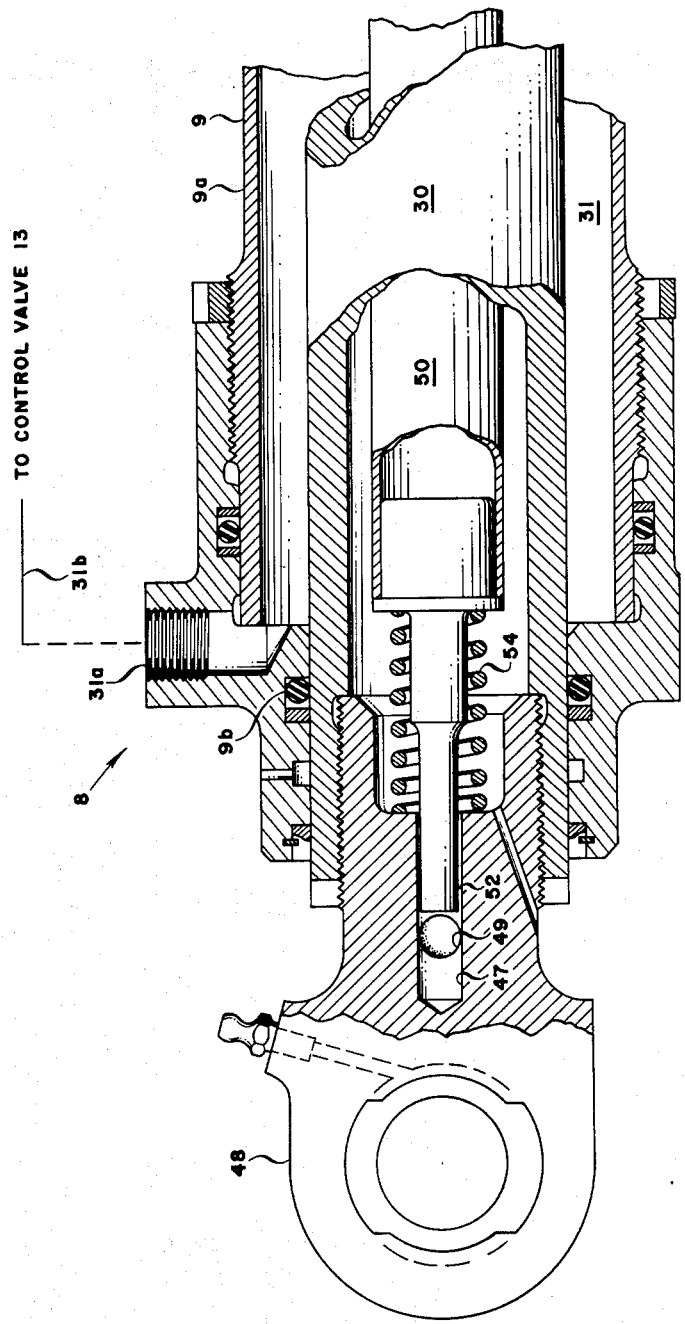
FIGURE 2 is a cross-sectional view of the other end of the hydraulic actuator embodiment of FIGURE 1.

More specifically, there is shown in FIGURES 1 and 2 the hydraulic actuator 8 comprising the cylinder barrel 9 having the piston assembly 29, including piston rod 30 and piston head 32, mounted for reciprocation therein. The piston rod 30 projects from the end 9a of cylinder barrel 9 and a seal 9b is provided for sealing the cylinder barrel with respect to the piston rod. The end of piston rod 30 external of cylinder barrel 9 is threadably secured to a rod end fitting 48 for connecting the piston assembly to a load such as an aircraft wheel bogie, for example, which applies a force in a direction to retract the piston rod 30 into the cylinder barrel. The other end 9c of the cylinder barrel 9 is beveled at its terminal end to form the cam surface and lock structure 9d, is threaded at 9e, and is provided with an annular groove in which the O-ring seal 9f is mounted. End 9c of the cylinder barrel 9 is closed by cap 10 provided with opposed trunnions for pivotally mounting the hydraulic actuator 8. The open threaded end 10a of the cap 10 is threadably engaged with the threads 9e of the cylinder barrel 9 such that the seal 9f is in sealing engagement with the cap 10 interior side wall with the terminal end of the cylinder barrel 9 seated on the annular seat 10b of the cap 10 to define the space or chamber 11 between the end of the cylinder barrel 9 and the end wall 10c of the cap 10. A tapped and threaded through hole 10d is formed in the cap end wall 10c and a pressure regulator valve 12 is threadably engaged therewith.

Pressure regulator valve 12 is connected by line 12a through a reversible control valve 13 to any appropriate source of fluid pressure (not shown) for supplying fluid pressure, in the order of 3,000 p.s.i. for example, to chamber 11 and to any appropriate reservoir (not shown) for the exhaust of fluid pressure from chamber 11. Pressure regulator valve 12 is of conventional design and when chamber 11 is connected to a source of fluid supply permits the unrestricted passage of fluid from the source into the chamber 11 and when chamber 11 is connected to reservoir permits the exhaust of fluid from chamber 11 to maintain a back pressure in chamber 11 of at least 300 p.s.i for example. Although pressure regulator valve 12 may take various forms, it preferably comprises a spring biased poppet valve element 12b having an orifice 12c and relief openings 12d therein. When flow is from the pressurized fluid source into the chamber 11, fluid pressure biases valve element 12b to open permitting unrestricted flow into chamber 11 through orifices opening 12c and relief openings 12d; and when flow is from chamber 11 to reservoir, valve element 12b is biased to its seated position and flow from chamber is permitted only through orifice opening 12c. The size of orifice opening 12c is selected such that it will permit the exhaust of fluid from chamber 11 at a rate so as to maintain a back pressure in chamber 11 of at least 300 p.s.i. or example during retraction of the piston rod assembly 29.

A through hole 10e is formed in the end wall 10c, centrally thereof, with which the stem 20a of indicator switch assembly 20 is threadedly engaged. A pin 22 is mounted in the through hole 10e for actuation of the switch assembly 20 for operation of an indicator display between lock and no lock indications upon movement of actuator post 40 into and out of locking position.

Figure 3:
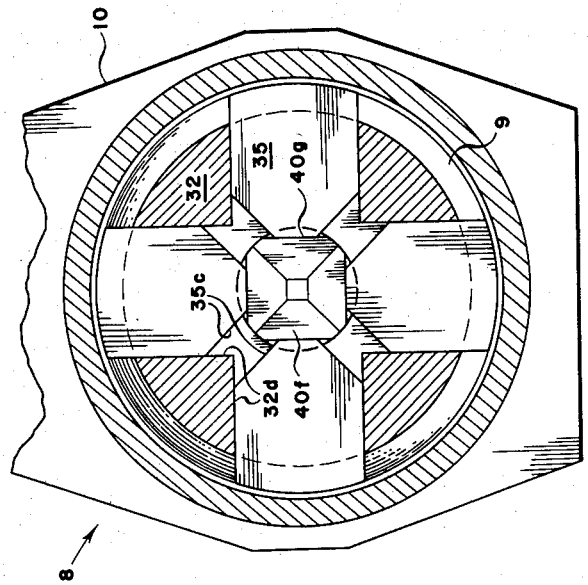
FIGURE 3 is a partial cross-sectional view of the entire cross section of the actuator taken along line 3—3 of FIGURE 1.

Piston assembly 29 mounted within cylinder barrel 9 defines therebetween the annulus 31 which is connected through port 31a, fluid line 31b (FIGURE 2) and control valve 13 to the source of pressure fluid in the order of 3,000 p.s.i., and to reservoir by control valve 13. Piston head 32 is provided with a central hole 33 which is counter bored at 33a from the head end of the piston assembly, which central hole is in fluid communication with annulus 31 through the radial port 33b and is provided with guide structure in the form of the slot 33c in alignment with its central axis. Although the piston head 32 is disclosed as being made integral with the piston rod 30, it is to be understood that they could as readily be removably secured thereto. Additionally, the piston head 32, which is in running fit engagement with the cylinder barrel 9, is provided with an annular groove in which the O-ring 32c is fitted for preventing leakage of fluid between the annulus 31 and the chamber 11. The piston head 32 is provided with preferably four symmetrically related radial slots or holes 32d into which the lock segments 35 are slidably mounted. To make possible their actuation, the lock segments 35 are each chamfered or beveled along their bottom interior and exterior corner surfaces to form the cam surfaces 35a and 35b. Also, the lock segments 35 are chamfered along their radial interior side edges at 35c (FIGURE 3) to permit their withdrawal to the unlocked position and to permit their interaction as they approach their unlocked position for preventing their rotation when they are made of cylindrical form. In addition, the piston head 32 is provided with an annular terminal end portion 32f, and a hole 32g is provided in the terminal end 32f to communicate pressure fluid in chamber 11 with both radial ends of lock segments 35.

For actuating the lock segments 35, an actuator post 40 is mounted for reciprocation within the axial or central through hole 33. One end of post 40 is of reduced diameter at 40a and is of rectangular cross-section at its terminal end 40b such that it is guidably fitted within the slot 33c. The other end or main body portion of post 40 is of a diameter at 40c to be in running fit relation with the counter bored portion 33a of through hole 33 and is of a diameter at 40d to be in running fit relation with the remainder of bore 33 to form therebetween the annular seat or area 40e. O-ring seals 41a and 41b are fitted into annular grooves formed in post portions 40c and 40d, respectively, to isolate the annulus 45 therebetween from other than pressure fluid in annulus 31 with which it is in fluid communication through port 33b.

The other terminal end of post 40 is chamfered or beveled on four sides pyramid-fashion to form the cam surfaces 40f (FIGURES 1 and 3) which are adapted to engage the complementary cam surfaces 35a of the lock segments 35. Immediately beneath each of the cam surfaces 40f is a rectangular planar face 40g and immediately beneath that another chamfered or beveled surface 40h of the same angular configuration as the cam surface 40f. Actuator post 40 is normally biased to the locked position as shown in FIGURE 1 by a compression spring 46 which surrounds the end portion 40a thereof and co-operates between the actuator post 40 and the bottom end wall of through hole 32.

When the hydraulic actuator 8 is utilized in an aircraft landing gear, it is necessary to provide a positive mechanical lock for maintaining the gear extended. Accordingly, a tube 50 (FIGURES 1 and 2) is provided in piston rod 30 for mechanically locking the actuator post 40 in its locked position. Toward this end, an axial guide hole 47 is bored in rod end fitting 48 and a transverse through hole 49 is provided intersecting the guide hole. Also, the tube 50 is provided with an end projection 52 mounted in the guide hole and a cylindrical cup-shaped connector 53 on its other end in which the terminal end 40b of the actuator post 40 is received. Tube 50 is biased toward the post 40 by spring 54 whereby the end wall 53a of the connector always engages the terminal end of post 40. To facilitate relative movement between tube 50 and post 40, a bushing 55 is secured to the terminal end of actuator post 40 and is received in connector 53. Bushing 55 also serves the purpose of limiting the retracion movement of the actuator post 40. For effecting positive mechanical locking of the actuator post 40 in its locked positon, a pin is inserted into through hole 49.

In operation of the hydraulic actuator 8, when the piston assembly 29 is in its locked position with the lock segments 35 in locking engagement with the cylinder barrel lock structure 9d, as shown in FIGURE 1, there is approximately 3,000 p.s.i. pressure, for example, in annulus 31. When it is desired to unlock the piston assembly 29, the annulus 31 is placed in fluid communication with reservoir and concomitantly the chamber 11 is placed in fluid communication with a source of fluid pressure in the order of 3,000 p.s.i., for example, by the operation of control valve 13. Pressure then builds up in chamber 11 and retracts the actuator post 40 to the left, as seen in FIGURE 1, against the counter-biasing force of spring 46, and the relatively insignificant force exerted by the pressure fluid in annulus 31 acting against post area 40e. Thereupon, the pressure in chamber 11 continues to increase until it becomes sufficient to move the load connected to piston assembly 29. At this time the piston assembly 29 begins to extend and the lock segments 35 are cammed out of their locked position by the interaction of their cam surfaces 35b with the complementary cam surfaces 9d of the cylinder barrel 9. Piston assembly 29 continues to move to its fully extended position at which time the pressure in chamber 11 builds up to its maximum of 3,000 p.s.i., assuming that such pressure was not required to move the load which would be the normal cose. It will be appreciated therefore that during the extension of piston assembly 29, the actuator post 40 is not in contact with the lock segments 35 and the lock segments therefore freely slide along the cylinder barrel 9 without galling or scoring it. Also, if there were no load opposing extension of piston assembly 29, a pressure regulator valve identical in construction to the valve 12 could be interposed in the fluid line between annulus 31 and reservoir to regulate the back pressure in annulus 31 and the rate of extension of the piston assembly 29.

When it is desired to retract the piston assembly 29, chamber 11 is connected to reservoir and annulus 31 is connected to the 3,000 p.s.i. fluid pressure source by operation of control valve 13. The pressure in annulus 31 acts against the annular area of piston head assembly 32 in communication therewith to apply a retraction force to piston assembly 29 and against the area 40e to apply an extending force to actuator post 40. Additionally, an extending force is applied to post 40 by spring 46. The lock segments 35 are prevented from being biased into engagement with the cylinder barrel 9 by the counterbalancing and extending of the forces tending to extend post 40 during the retraction of piston assembly 29. Accordingly, the regulator valve 12 is designed to maintain a back pressure in chamber 11 during the retraction stroke of the piston assembly 29 such that the pressure in chamber 11 times the area of post 40 in communication therewith is at least equal to and preferably greater than the pressure in annulus 31 times post area 40e plus the force of spring 46. Also, as pressure relief valve 12 is a restrictor type valve, it operates to regulate the flow of pressure fluid from the chamber 11 during retraction of the piston assembly 29, thus regulating the rate of retraction of the piston assembly. Upon the completion of the retraction stroke, the regulator valve 12 permits the depletion of pressure in chamber 11 at which time the force of pressure in annulus 31 acting against post area 40e and the force of spring 46 act together to extend the post 40 into locking engagement with the lock segments 35.

Either spring 46 or post area 40e, since they are parallel force systems, could be eliminated and the post could still be maintained retracted during the retraction stroke of piston assembly 29; but with a sacrifice of reliability. For example, in an aircraft application, the hydraulic actuator would be connected to an aircraft wheel bogie, such that the piston assembly 29 would retract under free fall of the bogie to the wheels down position even if there were failure of the hydraulic fluid pressure supply to annulus 31. Under such condition, the spring 46 would bias the actuator post 40 to the locked position upon depletion of the pressure in chamber 11 after the piston assembly 29 reaches its retracted position. If on the other hand the spring 46 breaks, the pressure acting against post area 40e will bias the port 40 to the locked position upon depletion of pressure in chamber 11.

Figure 4:
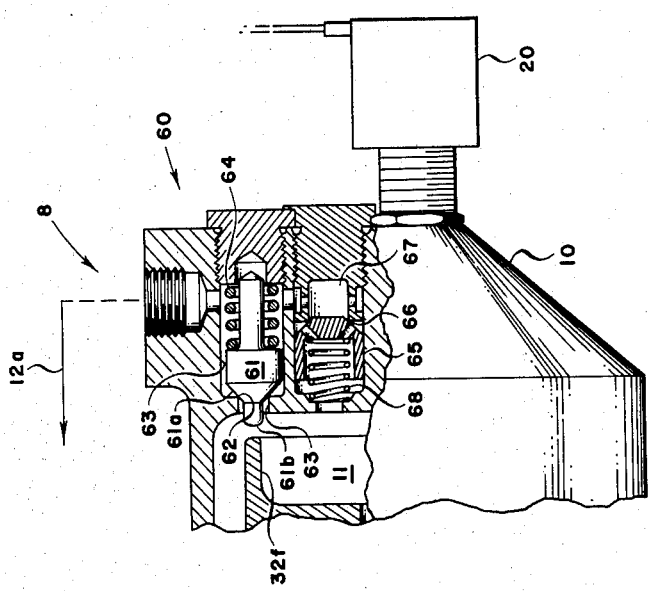
FIGURE 4 is a view, partially in section, of an alternate pressure regulator for the actuator.

Referring now to FIGURE 4, there is shown the pressure regulator 60 which may be used in lieu of the pressure regulator valve 12 to interconnect chamber 11 and line 12a. Regulator 60 comprises a poppet valve element 61 having a frustro-conical valve seat portion 61a and a reduced projecting end portion 61b which is biased against the seat 62 in valve passage 63 by the spring 64. Adjacent poppet valve element 61 is a second poppet valve element 65 which is biased against the seat 66 in valve passage 67 by the spring 68. During retraction of the piston assembly 29, the valve element 65 is biased to the closed position against seat 66 by the back pressure in chamber 11, and the valve element 61 is biased to the open position by the pressure in chamber 11 against the counter-biasing force of spring 64. The spring 64 is selected to be of a size to maintain a predetermined minium pressure in the order of 300 p.s.i., for example, in chamber 11 during retraction of piston assembly 29 such that post 40 will be maintained retracted during retraction of the piston assembly. Upon retraction of piston assembly 29 to the locked position, the end 32f of piston head 32 abuts the terminal end 61b of valve element 61 permitting depletion of fluid pressure in chamber 11 whereupon the force of pressure in annulus 31 acting against post area 40e and the force of spring 46 cause extension of post 40 to cam the lock segments 35 into the locked position. The pressure regulator 60 does not regulate to any appreciable extent the rate of flow of pressure fluid from chamber 11. Accordingly, if desired a conventional flow regulator could be provided in the line between regulator valve 60 and reservoir to restrict the flow of pressure fluid from chamber 11.

During extension of piston assembly 29, valve element 61 is initially open and valve element 66 is biased open by fluid pressure from the source and pressure fluid flows into chamber 11 to cause unseating of post 40 and then movement of piston assembly 29. After a short movement of piston assembly 29, the valve element 61 becomes seated and pressure fluid flows into chamber 11 only through valve element 66, the ports therein being of sufficient size to permit substantially unrestricted flow of pressure fluid into chamber 11 for extension of the piston assembly 29.

It will be appreciated from the above that in the hydraulic actuator of this invention the lock segments' engagement with the cylinder barrel during extension and retraction of the piston assembly is minimized, thus permitting the use of durable, high-strength lock segments without fear of galling or scoring the actuator barrel body. By reason of this advancement in the art, hydraulic actuators may be made of higher strength materials of less weight and of simpler construction than heretofore possible.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

What is claimed is:

1. A hydraulic actuator comprising:
a cylinder barrel; a piston assembly mounted for extension and retraction within said cylinder barrel; piston assembly mounted lock means for locking said piston assembly with respect to said cylinder barrel at a predetermined relative position; a first control means arrangement movable relative to the piston assembly and activated by pressurized fluid for preventing biasing of said lock means toward locked position during extension of said piston assembly; and a second control means arrangement activated by pressurized fluid for preventing biasing of said lock means toward locked position during retraction of said piston assembly.

2. A hydraulic actuator comprising:
a hollow cylindrical body barrel; a piston assembly mounted for extension and retraction in said body; piston assembly mounted lock means including at least one lock segment mounted for radial actuation into locking engagement with said cylinder barrel body at one end of the stroke of said piston assembly; and lock actuating means for biasing said lock segment toward locking engagement with said cylinder barrel body only at said one end of said stroke.

3. A hydraulic actuator comprising:
a cylindrical barrel body; a piston assembly including a piston head and piston rod mounted for reciprocation in said barrel; lock structure in said barrel; a longitudinal bore formed through said piston head; at least one radial through hole intersecting said longitudinal bore; a lock segment slidably mounted in said radial through hole; a fluid pressure operated actuator pin mounted for reciprocation in said longitudinal bore; a first fluid pressure control means biasing said actuator pin into cooperating engagement with said lock segment to slide said lock segment into engagement with said lock structure when operatively adjacent said lock structure; and a second fluid pressure control means biasing said actuator pin out of cooperating engagement with said lock segment when said lock segment is not operatively adjacent said lock structure, said second fluid control means being ineffective only when said lock segment is operatively adjacent said lock structure.

4. A hydraulic actuator comprising:
a cylinder barrel closed at one end; lock structure in said cylinder barrel; a piston assembly including a piston head and a piston rod slidably mounted in said barrel, said piston rod extending outwardly from one end of said barrel and sealed with respect thereto; an annulus defined by said cylinder barrel and said piston rod in communication with one side of said piston head; a chamber defined by said closed end and the other side of said piston head; control means for alternately connecting said annulus and said chamber to a source of pressure fluid supply and to exhaust; an axial hole formed in said piston head; a port communicating said axial hole with said annulus; at least one radial through hole formed in said piston head intersecting said axial hole; a lock segment in said radial through hole having a cam surface on its radially interior and exterior end corners at one side thereof; an actuator pin mounted for reciprocation in said axial hole, said actuator pin having an annular pressure area in communication with said annulus through said port and a cam surface formed on the end of said actuator pin closest to said chamber; and means for maintaining a back pressure in said chamber for maintaining said actuator pin retracted during retraction of said piston assembly when said control means connects said annulus with a source of fluid pressure for retracting said piston assembly; said back pressure maintaining means relieving the pressure in said chamber upon retraction of said piston assembly to the locked position whereby said lock segment is biased into locking engagement with said lock structure by said actuator pin; said control means connecting said chamber to a source of pressure fluid supply and said annulus to exhaust for extension of said piston assembly.

5. In a hydraulic actuator, a cylinder barrel;
a piston assembly including a piston head and a piston rod slidably mounted in said barrel, said piston rod extending outwardly from one end of said barrel and sealed with respect thereto; an annulus defined by said cylinder barrel and said piston rod in communication with one side of said piston head; a cap closing the other end of said barrel; a chamber defined by said cap and the other end of said piston head; fluid pressure regulator means connected to said chamber; control valve means for alternately connecting said annulus and said chamber to a source of fluid supply and to reservoir; an axial bored and counter bored hole formed in said piston head; at least one port communicating said bore with said annulus; radial through holes formed in said piston head intersecting said counter bore; a lock segment in each of said radial through holes, each of said lock segments having a cam surface on its radially interior and exterior end corners at one side thereo; an actuator pin mounted for reciprocation in said piston head axial hole, said actuator pin having a head end of the same diameter as the counter bore of said axial through hole and a stem portion of the same diameter as the bored portion of said axial through hole, the head and stem of said actuator pin at their juncture forming an annular pressure area in communication with said annulus through said port; and cam surfaces formed on said head end of said actuator for cooperating engagement with said interior cam surfaces of said lock segments.

6. The hydraulic actuator of claim 5 wherein guide structure is provided in said axial hole for preventing rotation of said actuator pin.

7. The hydraulic actuator of claim 5 wherein resilient means are provided for normally biasing said actuator pin in a direction toward cooperating engagement of the cam surfaces of its head end with said interior cam surfaces of said lock segments.

References Cited by the Examiner

UNITED STATES PATENTS

| 1,183,213 | 5/16 | Lewis | 91—45 |
| 1,842,776 | 1/32 | Bogoslowsky | 92—25 |
| 2,163,982 | 6/39 | Mercier | 92—24 |
| 2,290,256 | 7/42 | Souter | 92—24 |
| 2,764,132 | 9/56 | Bakke | 92—25 |
| 3,008,454 | 3/61 | Wilkins | 92—24 |

FOREIGN PATENTS

| 573,033 | 11/45 | Great Britain. |
| 362,577 | 8/38 | Italy. |

SAMUEL LEVINE, *Primary Examiner.*
FRED E. ENGELTHALER, *Examiner.*